United States Patent Office 3,533,799
Patented Oct. 13, 1970

3,533,799
COLOR PHOTOGRAPHIC MATERIAL FOR THE
SILVER DYE BLEACH PROCESS
Horst Nickel and Fritz Suckfüll, Leverkusen, Bernhard
Seidel, Cologne-Mulheim, Erich Böckly, Leverkusen,
and Hermann Wunderlich, Cologne-Mulheim, Germany, assignors to Agfa-Gevaert Aktiengesellschaft,
Leverkusen, Germany, a corporation of Germany
No Drawing. Filed Sept. 29, 1966, Ser. No. 583,114
Claims priority, application Germany, Oct. 15, 1965,
A 50,510; Jan. 31, 1966, A 51,464; Feb. 8, 1966,
A 51,521
Int. Cl. G03c 1/10
U.S. Cl. 96—99     7 Claims

ABSTRACT OF THE DISCLOSURE

A light-sensitive photographic silver halide material provides yellow azo dyes which is easily bleachable and fast to light and resistant to diffusion in the gelatin layer of the photographic material having a grouping according to the formula

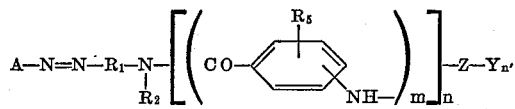

wherein
A is

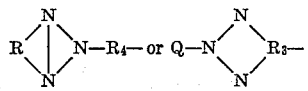

R being a ring of the benzene or naphthalene series, fused to the triazole ring at ortho locations;
Q being a ring of the benzene or naphthalene series;
$R_3$ being a ring of the benzene or naphthalene series; fused to the triazole ring at ortho locations; and
$R_4$ being a bivalent radical of the phenylene or naphthylene series;
and
$R_1$ is a bivalent radical of the p-phenylene or 1,4-naphthylene series;
$R_2$ is hydrogen or alkyl;
$R_5$ is hydrogen, alkyl, alkoxy or sulfo.

The present invention relates to color photographic materials for the silver dye bleach process, which materials contain azo dyes having triazole rings, more particularly yellow azo dyes.

It is known that color photographic images can be produced by the silver-dye-bleach process, wherein a dye, usually an azo dye, is bleached in a homogeneously dyed colloid layer in accordance with a silver image which has been produced photographically.

According to this process, it is possible to produce both negatives and reversal images. If it is desired to produce positive paper prints or duplicate positives from diapositives, the silver image is produced by means of a simple black-and-white development, this silver image representing a negative of the copying original. Since the image dye which is homogeneously distributed in the layer (or in the 3 layers of a multicolor material) is bleached proportionately to the silver image, a dye image is obtained, which is positive with respect to the original. If a silver image is produced which is positive with respect to the original, for example, by a black-and-white reversal development or by the bromide ion diffusion method or silver salt diffusion method, then after the color bleaching a dye image is formed which is opposite in gradation to the original that is to say a positive color image is formed if the original is a negative color image.

The standards set as regards dyes for the process described are particularly high, since these dyes must be spectrally suitable, and should also be easily bleachable and fast to light. Furthermore, they must not detrimentally affect the photographic emulsion and must be completely resistant to diffusion in the gelatin, which is almost exclusively used as layer former. It is particularly important to have a high degree of fastness to light, and resistance to acid gases, such as occur, for example, in industrial atmospheres.

It is the object of the invention to provide new yellow azo dyes suitable for the silver dye bleach process.

The above object has been attained by providing azo dyes containing triazole rings. These azo dyes have the following general formula:

(I)     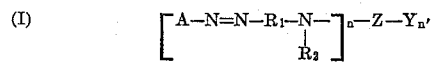

wherein
A=a triazole grouping of the following formulae (II)     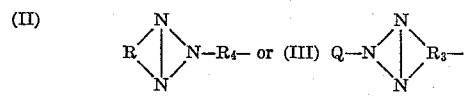

R=a fused aryl or heterocyclic ring, wherein the nitrogen atoms of the triazole grouping are attached in o-position to each other, the rings being preferably of the benzene or naphthalene series, the rings of which may contain one or more further substituents, in particular nitro, halogen such as chlorine or bromine, a triazole grouping, sulfo, sulfonamide or sulfonamido substituted with alkyl or phenyl, other azo groupings or alkyl or alkoxy groups preferably having up to 3 carbon atoms, such as methoxy or ethoxy, amino, alkyl- or aryl-substituted amino or acylated amino, in which case the acyl group is preferably derived from aliphatic or aromatic mono- or dicarboxylic acids. Additional azo dye groupings may also be linked through the acyl group, particularly suitable groups being acylamino groups of the following formulae:

(IV)     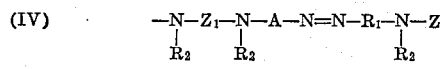

(V)     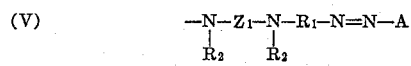

R is most preferably a naphthyl group substituted with up to 3 sulfo groups, which naphthyl group may, if desired, also contain further substituents of the type indicated above.

Q=an aryl or hetreocyclic ring, preferably of the benzene or naphthalene series, which rings may contain further substituents, especially nitro, halogen such as chlorine or bromine, a triazole grouping, sulfo, sulfonamido, sulfonamido substituted with alkyl or phenyl groups, further azo groupings, alkyl or alkoxy preferably with up to 3 C-atoms, such as methoxy or ethoxy, amino, alkyl- or aryl-substituted amino or acylated amino, in which case the acyl group is preferably derived from aliphatic or aromatic mono- or dicarboxylic acids; other azo dye residues may also be linked through the acyl group, particularly preferred groups are, for example, those of the following formulae:

(IV)     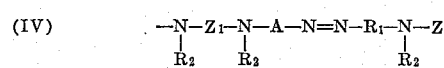

(V)     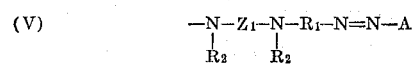

Q is most preferably a naphthyl group substituted with up to 3 sulfo groups and in addition contains, if desired further substituents of the above mentioned type;

$R_1$=an aromatic radical, preferably a radical from the phenylene or naphthylene series, in which the azo group and the grouping

are preferably in the p-position to each other; $R_1$ can be further substituted, for example, by alkyl or alkoxy having preferably up to 3 carbon atoms, amino or alkyl amino, phenylamino or acylamino, wherein the acyl group is preferably derived from short chain aliphatic or benzene carboxylic acids such as acetyl or propionyl or benzoic, sulfo or the like;

$R_2$=hydrogen or alkyl having preferably up to 3 carbon atoms;

$R_3$=a fused aryl or heterocyclic ring, wherein the nitrogen atoms of the triazole grouping are attached in o-position to each other, preferably a radical of the phenylene or naphthylene series. $R_3$ is preferably substituted with at least one sulfo group. $R_3$ is most preferably a 4,8-disulfo naphthyl grouping which contains in 2-position the azo grouping and in 5,6-position the triazole grouping; $R_3$ may also be substituted with, for example, halogen such as chlorine, or bromine, nitro, sulfonamide, alkyl or alkoxy having up to 5 carbon atoms such as methyl, methoxy or ethoxy;

$R_4$=a bivalent aromatic radical, preferably a radical from the phenylene or naphthylene series, such as phenylene, bisphenylene or naphthylene; $R_4$ is more especially a naphthylene radical carrying the azo and the triazole groupings in the 1,3-, 1,4-, 1,5-, 1,6-, 1,7-, 2.6- or 2,7- position; $R_4$ is preferably substituted with at least one sulfo group but may also be substituted with, for example, halogen, such as chlorine or bromine, nitro, sulfonamide, alkyl or alkoxy, having up to 5 carbon atoms, such as methyl, methoxy or ethoxy;

Z=an $(n+n')$-valent aromatic, quasi aromatic or aliphatic acyl radical, carbamyl- or carbonyl radical, preferably carbonyl (—CO—) or the radical of a dibasic organic acid, in particular one of the following radicals:

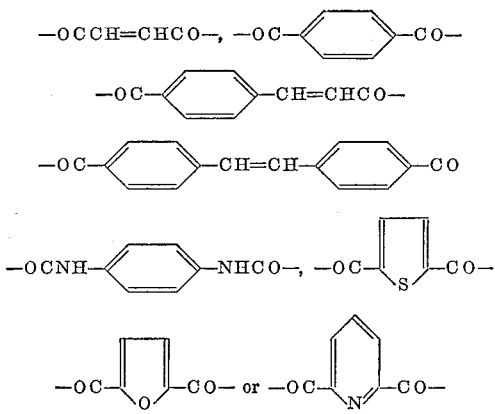

$n$=an integer between 1 and 4, preferably 1 or 2;

$n'$=an integer between 0 and 3, preferably 1 or 2, such that $(n+n')$ is an integer between 1 and 4;

Y=an azo dye grouping preferably of the type indicated by formula I or any yellow azo dye grouping, for example, of the azo dyes described in Belgian Pat. No. 668,339;

$Z_1$=a bivalent acyl radical preferably an acyl radical derived from a short chain aliphatic dicarboxylic acid or from a dicarboxylic acid of the benzene series, a carbamyl radical or carbonyl radical, for example, —CO— or one of the following formulae:

—OCCH=CHCO—, —CO—⟨⟩—CO—

—OC—⟨⟩—CH=CHCO—

—OC—⟨⟩—CH=CH—⟨⟩—CO

—OCNH—⟨⟩—NHCO—, —OC—[S]—CO—

—OC—[O]—CO— or —OC—[N]—CO—

Dyes of the following Formula VI have proved to be especially suitable:

VI $\left[ A-N=N-R_1-N\underset{R_2}{} \left( CO-\underset{NH-}{\overset{R_5}{\bigcirc}} \right)_m \right]_n Z-Y_{n'}$ in which $R_5$=hydrogen or any substituents such as an alkyl group preferably with up to 3 C-atoms, alkoxy preferably having up to 3 C-atoms, sulfo and the like;
$m$=1 or 2, preferably 1;

the other symbols having the meaning already indicated.

Suitable are both monoazo dyes, i.e., those of the above general formula, wherein $n$=1 and z=a monovalent acyl- or carbamyl radical of a mono- or polyfunctional acylating agent, and polyazo dyes in which the dye radical containing the triazole group is present several times in the molecule, e.g., three times as in the case of acyl radicals which are derived from a triazine nucleus.

The folowing dyes, for example, have proved to be especially suitable:

(1)
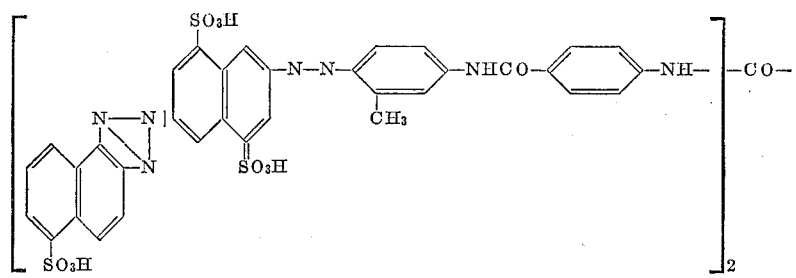

(2) 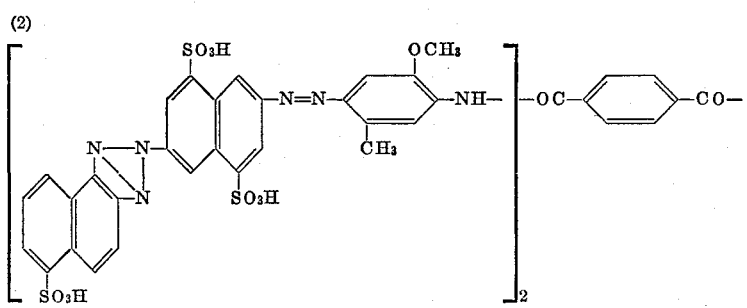
(3) 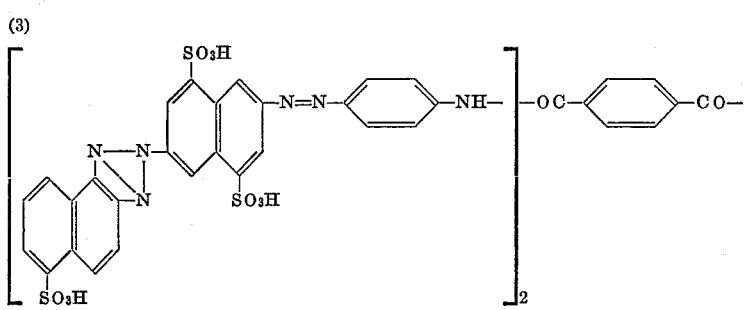
(4) 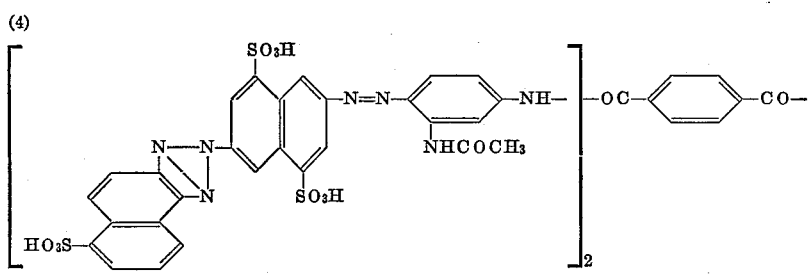
(5) 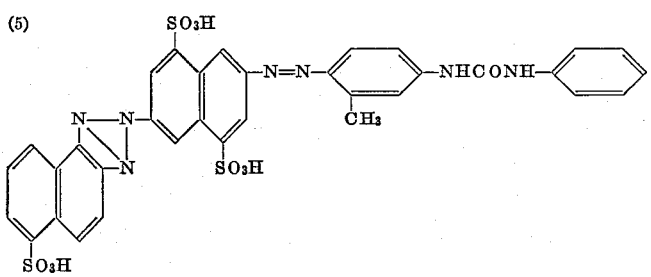
(6) 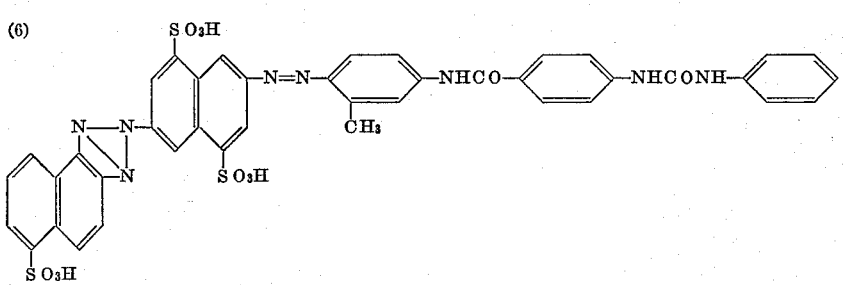
(7) 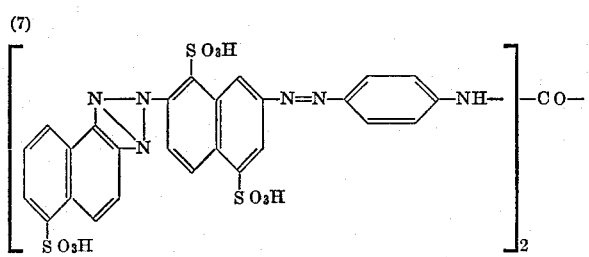

(8) 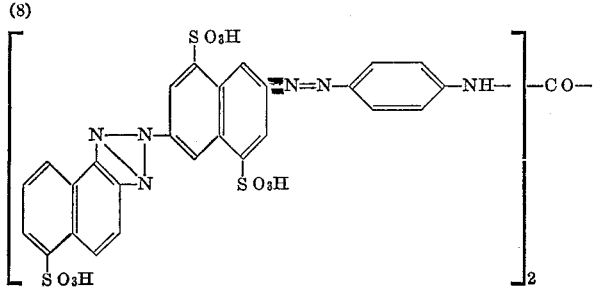
(9) 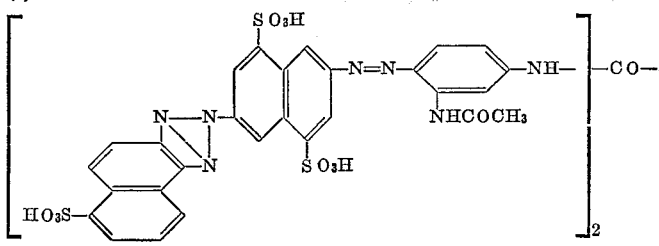
(10) 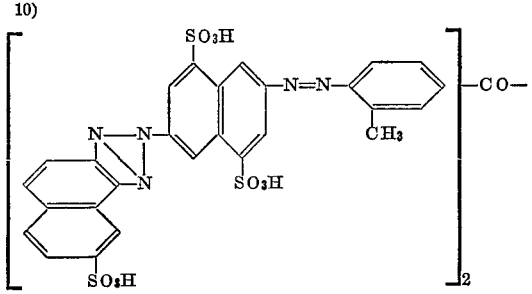
(11) 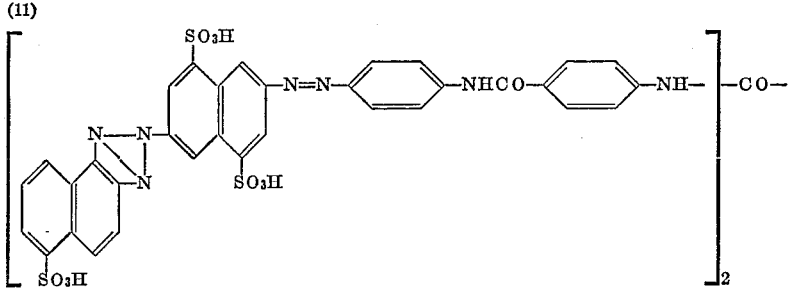
(12) 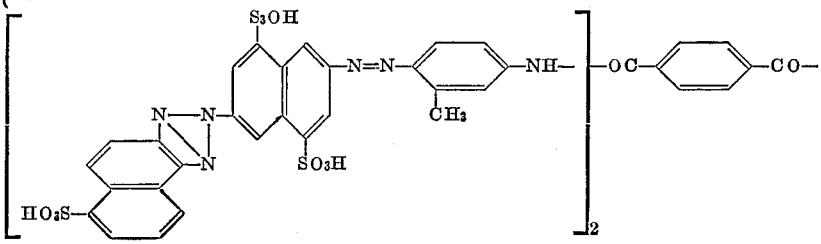
(13) 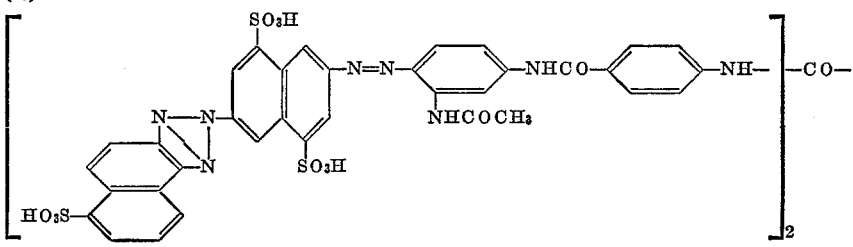

(14) 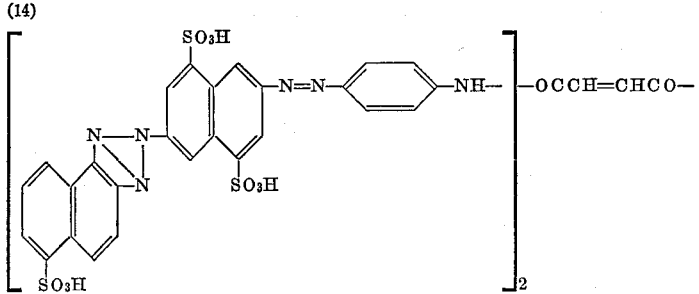
(15) 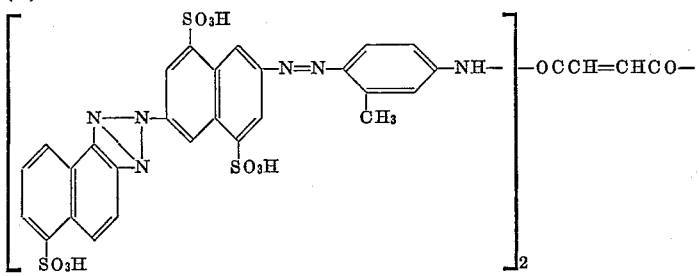
(16) 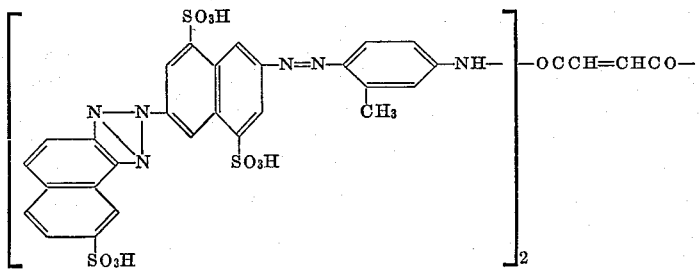
(17) 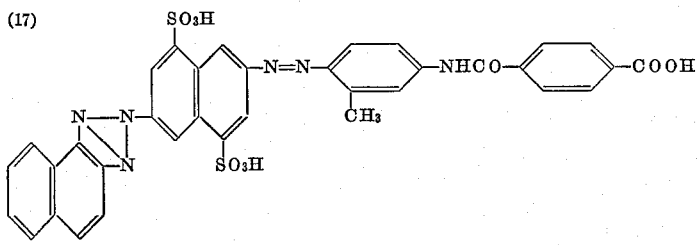
(18) 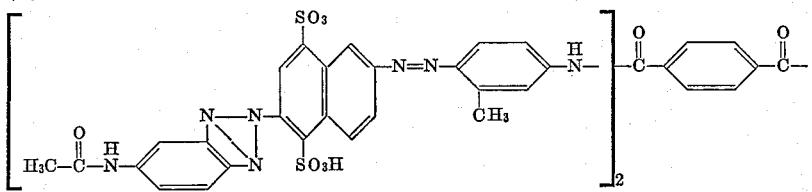
(19) 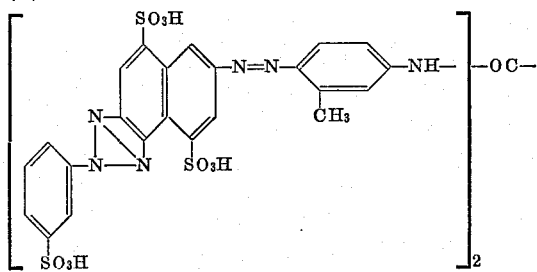

(20)
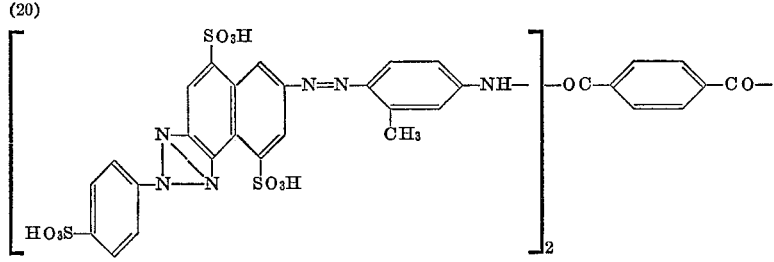
(21)
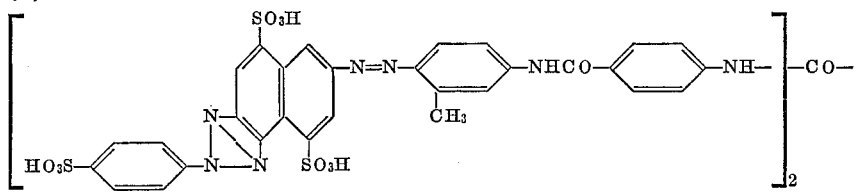
(22)
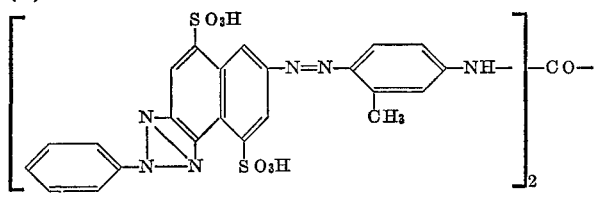
(23)
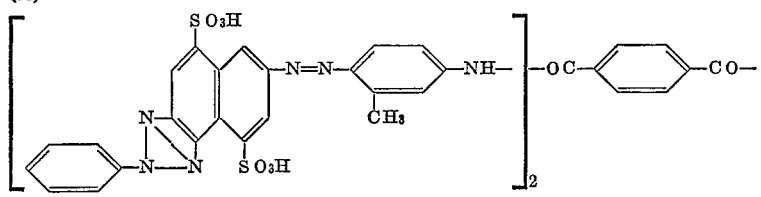
(24)
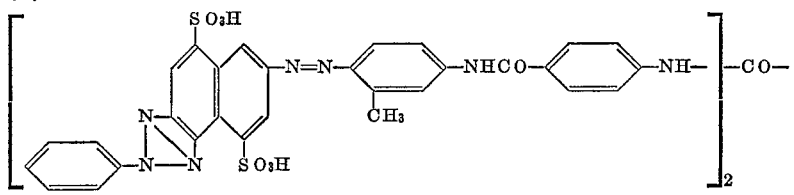
(25)
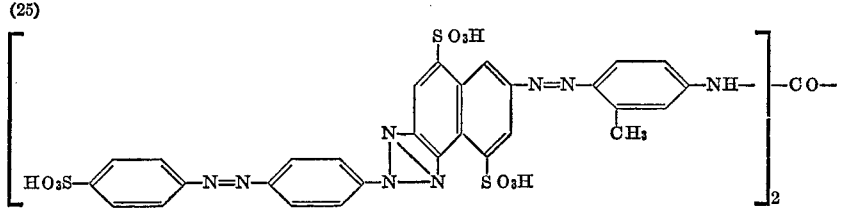
(26)
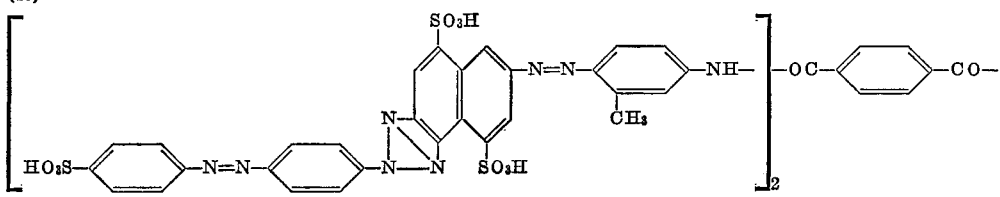

(27) 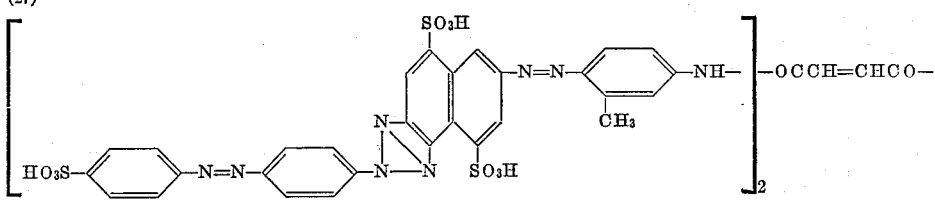
(28) 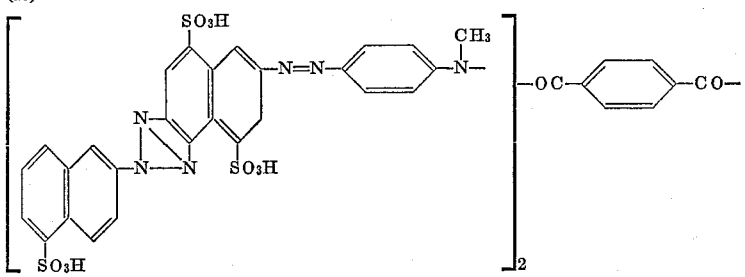
(29) 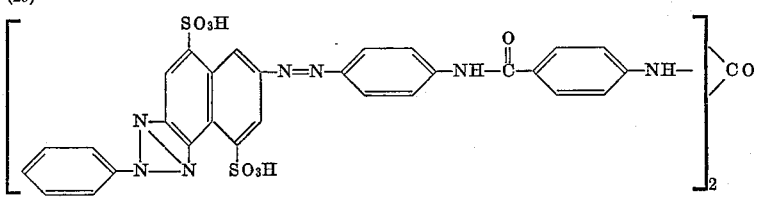
(30) 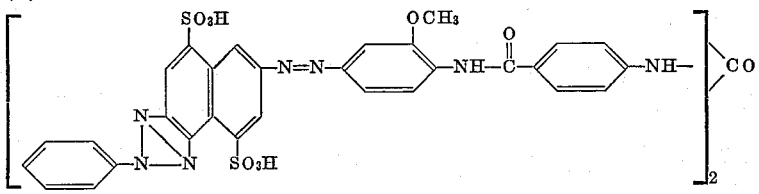
(31) 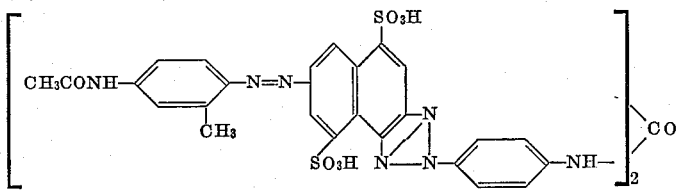
(32) 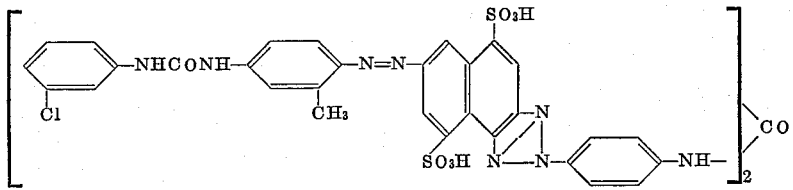
(33) 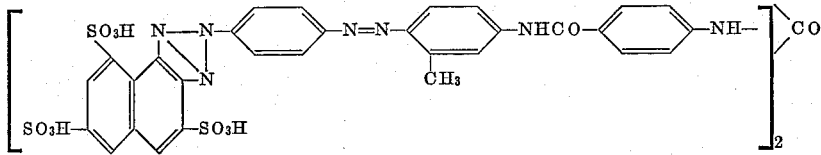
(34) 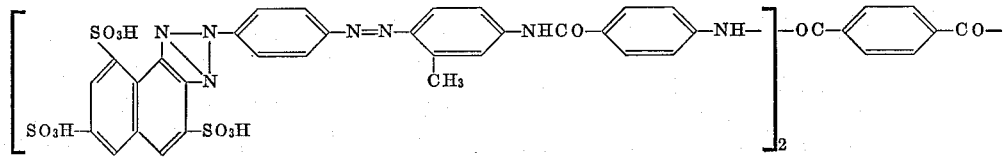

(35) 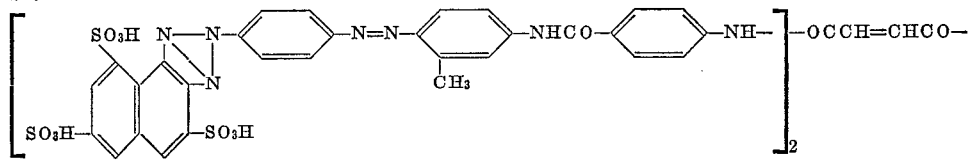
(36) 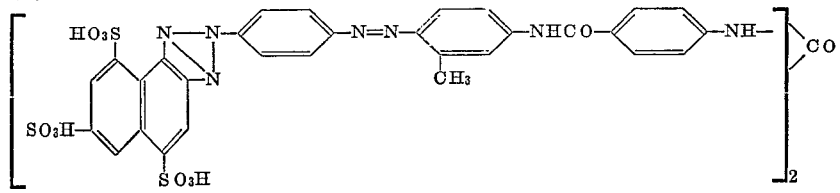
(37) 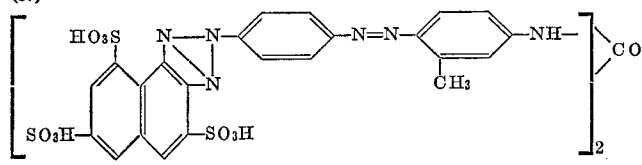
(38) 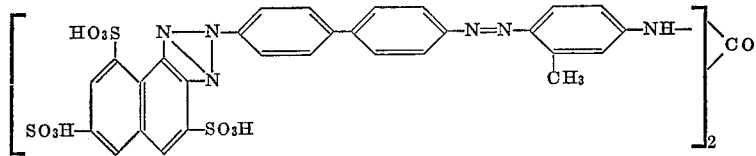
(39) 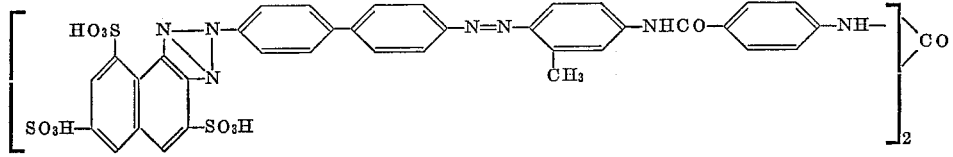
(40) 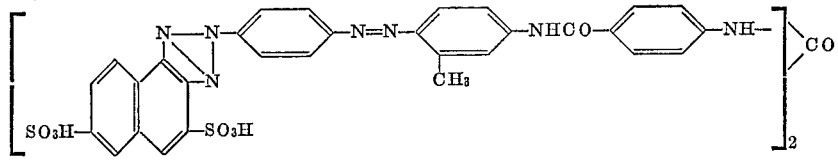
(41) 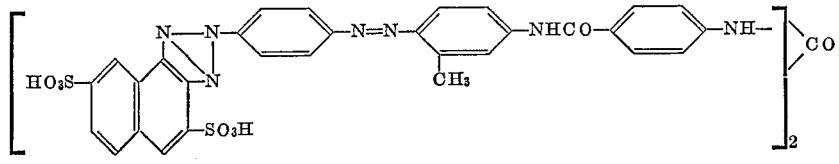
(42) 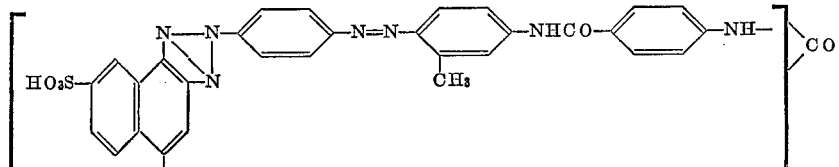
(43) 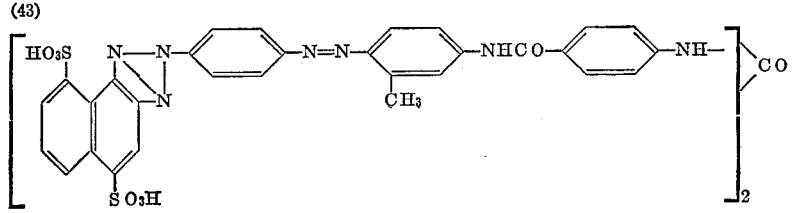

(44) 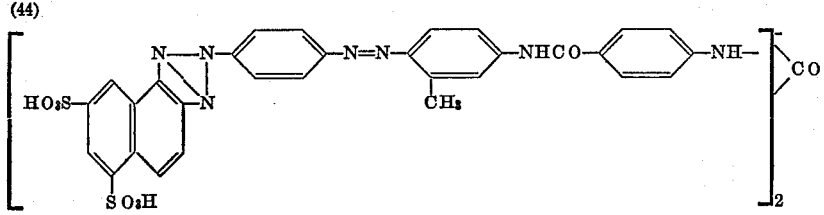
(45) 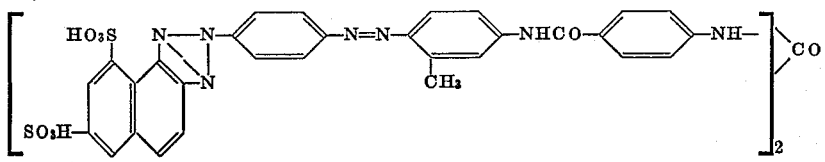
(46) 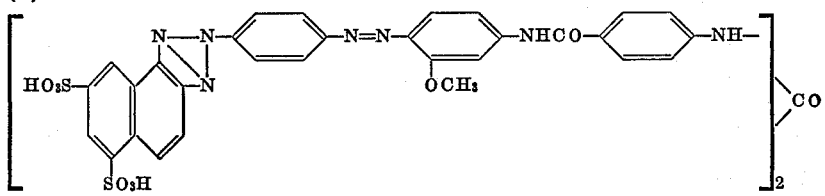
(47) 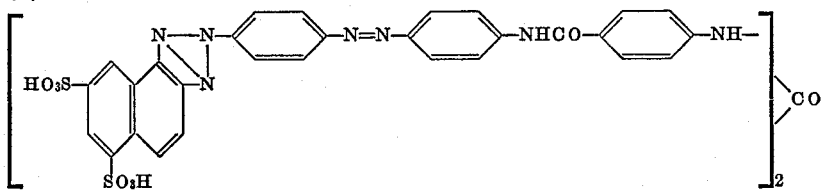
(48) 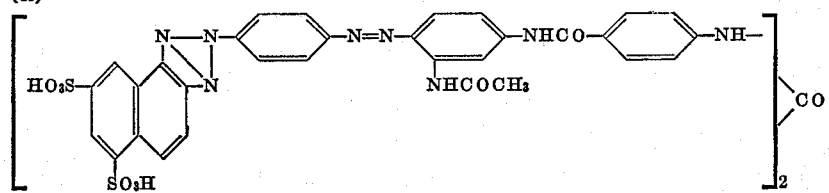
(49) 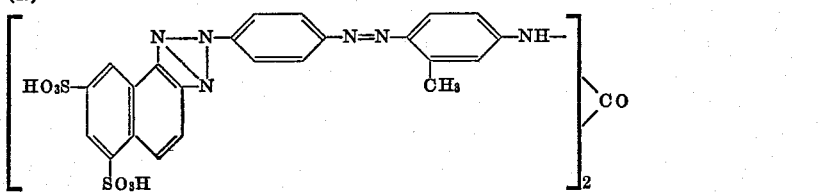
(50) 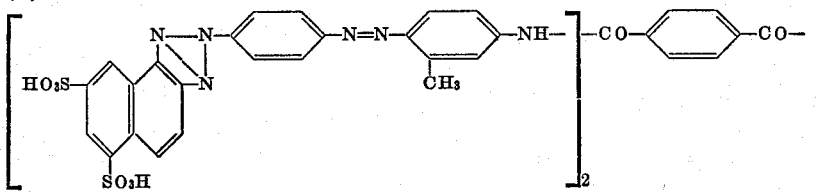
(51) 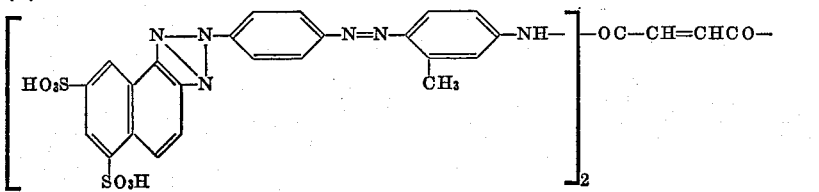

(52) 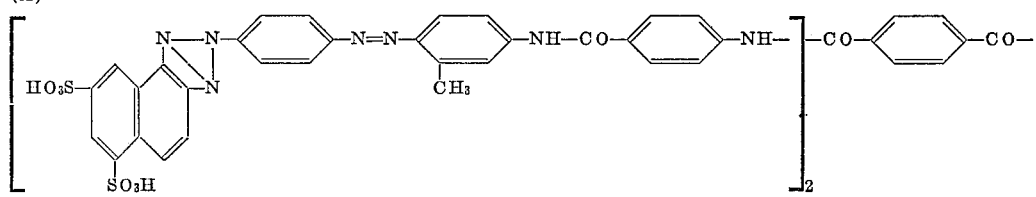
(53) 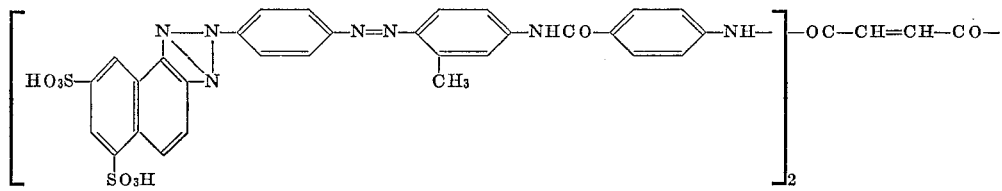
(54) 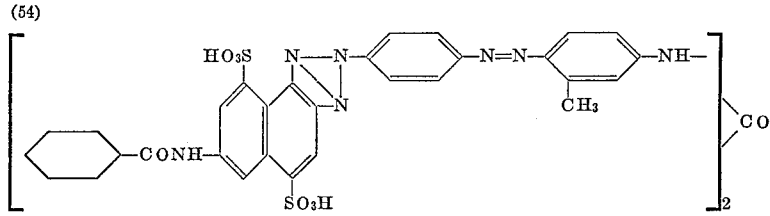
(55) 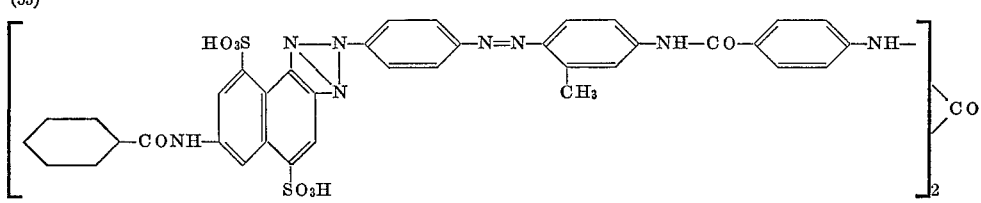
(56) 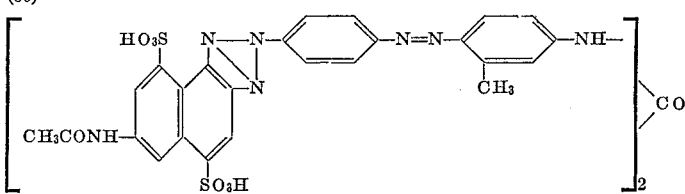
(57) 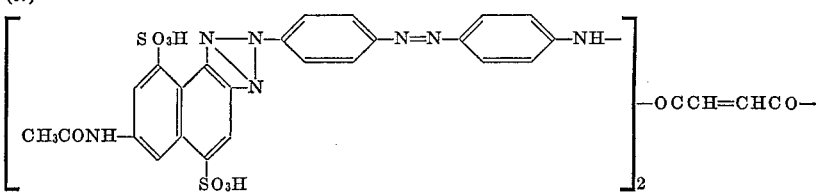
(58) 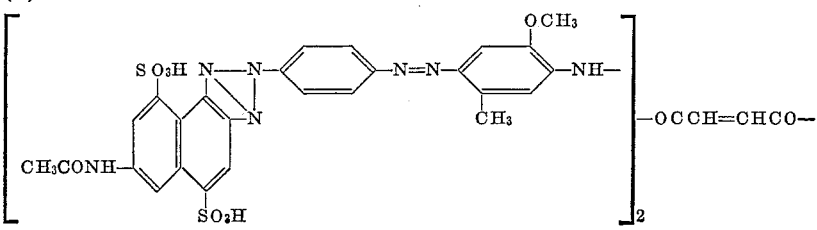
(59) 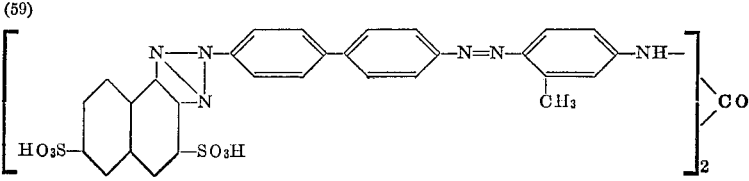

(60) 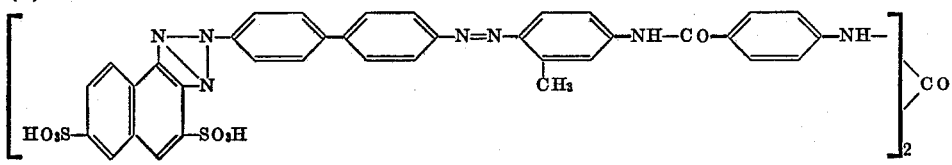
(61) 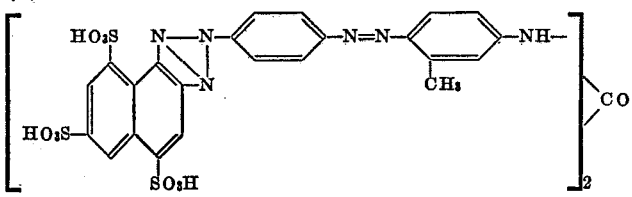
(62) 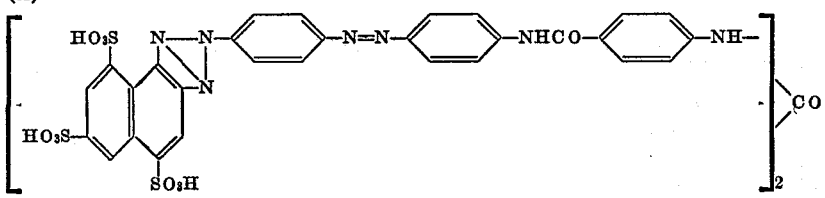
(63) 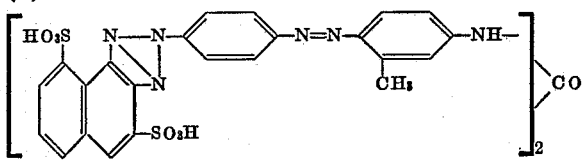
(64) 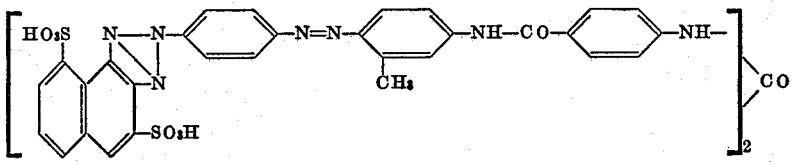
(65) 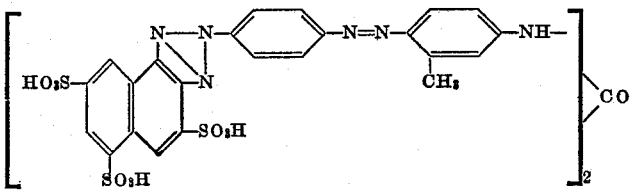
(66) 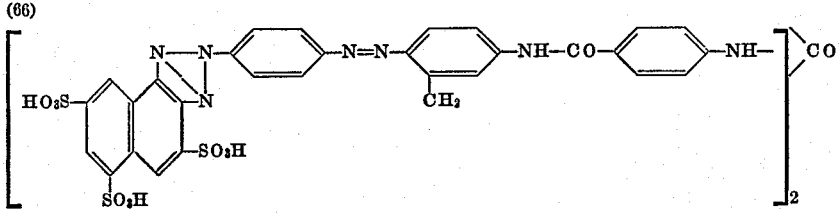
(67) 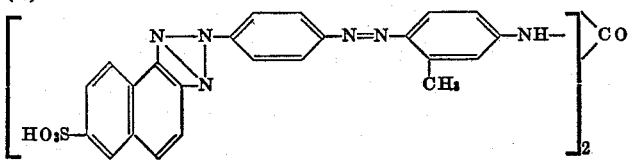

(68) 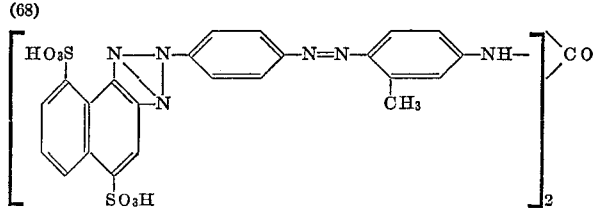
(69) 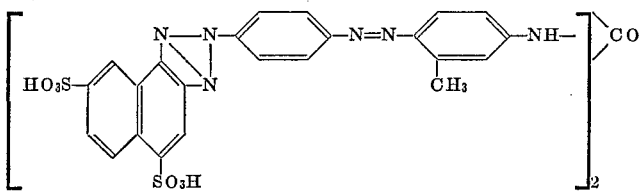
(70) 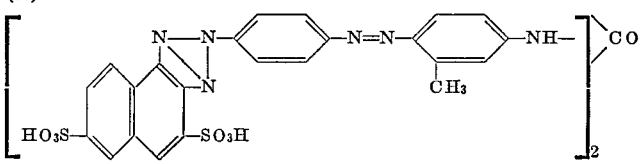
(71) 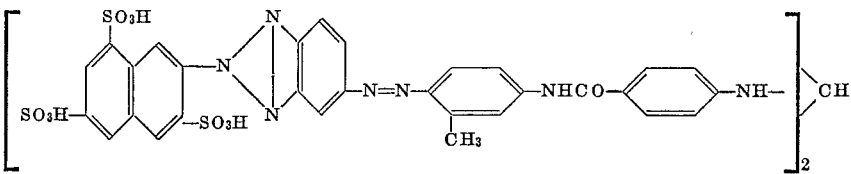
(72) 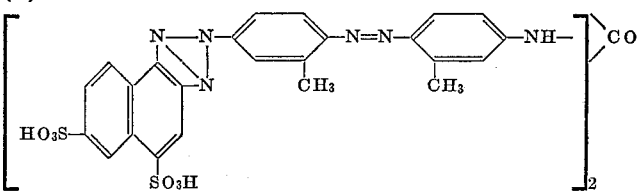
(73) 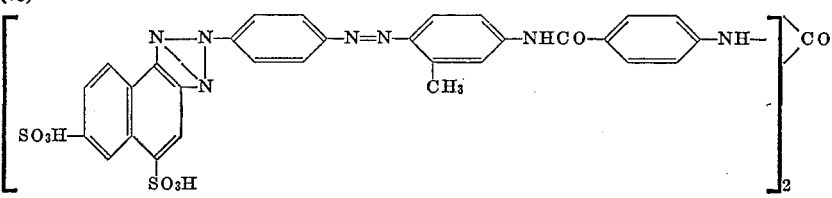
(74) 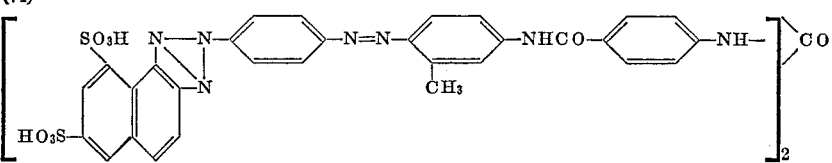
(75) 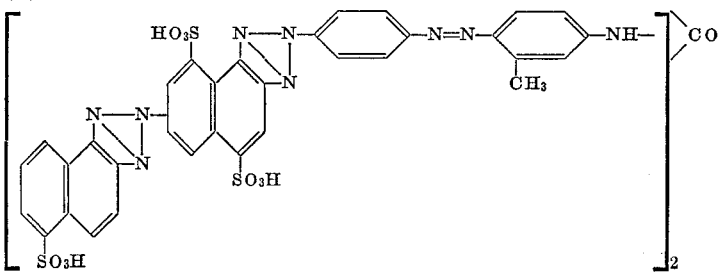

(76) 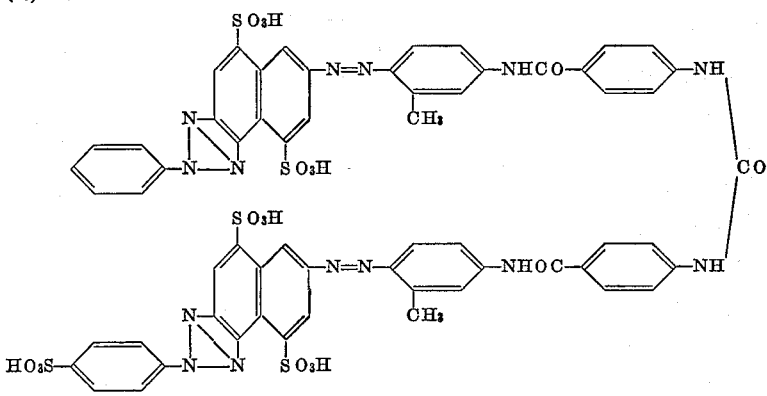
(77) 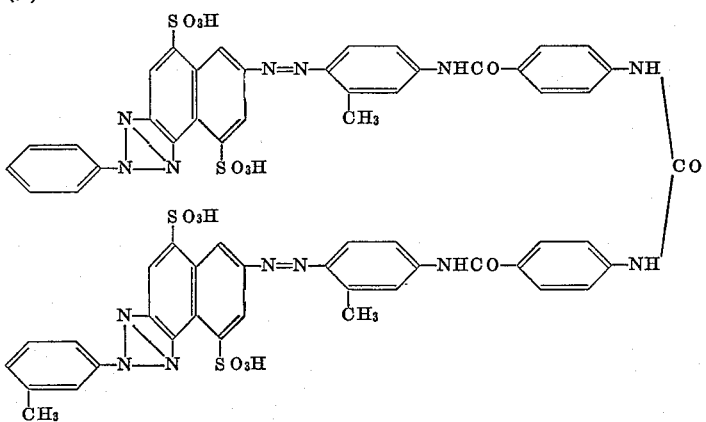
(78) 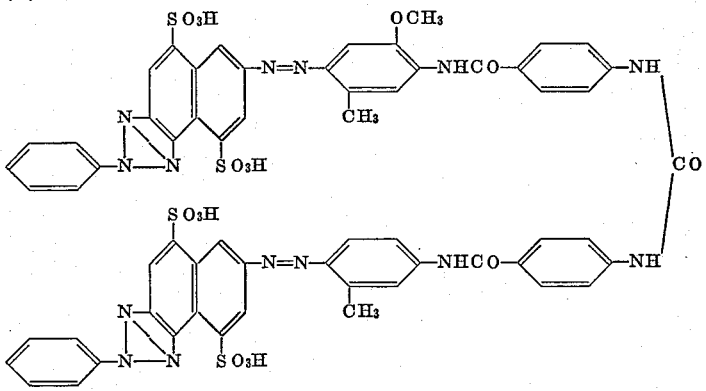
(79) 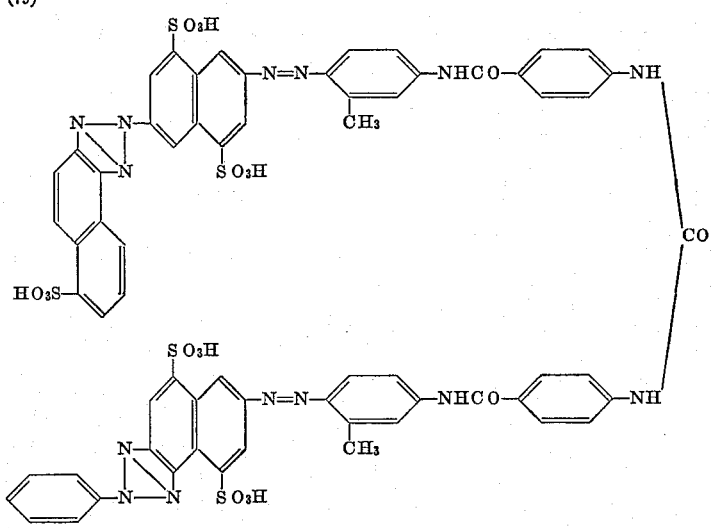

(80)

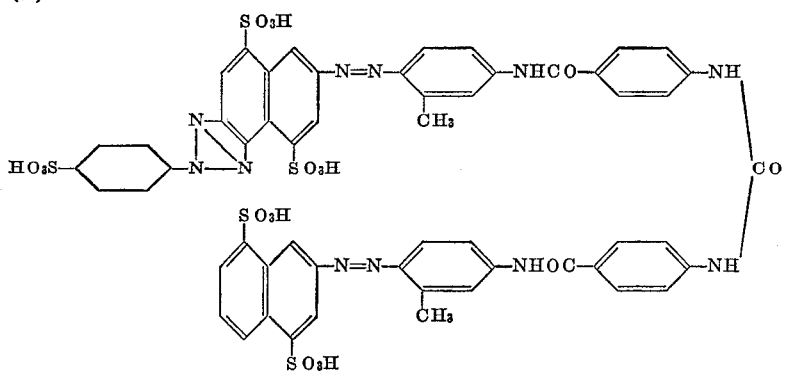

The dyes according to the invention are prepared by methods known per se.

The preparation of dyes 1 to 18 of the above formulae is described in United Kingdom Pat. No. 1,101,364, filed Aug. 5, 1966, published Jan. 31, 1968, the counterpart to the application made in Germany No. F 46,887 on Aug. 13, 1965, and the preparation of dyes 19 to 30 is described in German Pat. No. 1,115,865.

Methods for the preparation of dyes 35–75 have been described in German Pat. No. 1,153,124 and in U.S. Pat. No. 2,795,577.

Speaking quite generally to prepare, for example, a dye of the general Formula 33, wherein R, denotes phenylene, p-nitroaniline is first diazotized, coupled to an aminonaphthalene sulfonic acid and the salted out dye is converted into a triazole with copper salts in the usual manner. The nitro group is reduced to an amino group in the usual manner, for example, with iron in acetic acid, and the diazotized amino triazole dye is coupled to an aromatic amine at the p-position, the isolated aminoazo triazole dye is, if desired, acylated with a nitrobenzoyl chloride, the nitro group is reduced and then acylated in a highly dilute solution with the desired acylating agent, for example, phosgene, fumaric acid dichloride, terephthalic acid dichloride or other acylating agents.

The dyes of Formulae 76–80 can be prepared by reacting monoazo dyes with polyvalent acyl compounds such as the chlorides of polybasic acids, for example, phosgene, terephthaloyl dichloride or cyanuric chloride. The monoazo dyes containing amino groups can be introduced into the reaction in any molar ratio. It is generally not necessary to separate the resulting mixtures of asymmetrical and symmetrical dyes. It may even be preferable to use the resulting dye mixtures directly for the preparation of the photosensitive materials.

Another method for preparing dyes of Formulae 76–80 is described in German Pat. No. 871,000.

Because of their excellent properties, the dyes according to the invention can be used in various ways in color photographic layers for the silver dye bleach process. As shown in the following examples, they are used preferably as image dyes in layers which are subjected to a simple black-and-white negative development and thus lead to direct positive dye images in the subsequent dye bleaching bath. However, one could equally well perform a black-and-white reversal development, and after passing the film through the treatment baths of the silver dye bleach process, dye images are obtained which have a characteristic curve opposite to that of the original such as required for the production of positive colored prints or transparencies starting from a color negative.

The dyes mentioned above are largely inert to the usual quantities of emulsion additive such as optical or chemical sensitizers, stabilizers, plasticizers, wetting agents, hardening agents and other substances.

As will be shown in the examples given below, they can be bleached to pure whites in different types of bleaching baths, e.g., those based on quinoline and iodide (as described in U.S. Pat. No. 2,629,568, Example 29) or those based on thiourea (as in British Pat. No. 507,211) and with the use of different bleaching catalysts such as quinoxalines, phenazine derivatives and the like.

The azo dyes according to the invention are generally so resistant to diffusion in gelatin or in gelatin-containing layers which are the substances almost exclusively used as binding agents, that they do not require any further mordanting, for example, by means of organic bases of the 4,4'-diphenyl-di-bis-guanide type. Apart from being used in layers containing gelatin as a binder, they may also be used in layers in which gelatin is partly or entirely replaced by other natural or synthetic substances such as polyvinyl alcohol, polyvinyl pyrrolidone, celllulose derivatives, alginic acid esters etc.

The dyes to be used according to the invention can be be added to all types of silver halide emulsion such as silver chloride, silver bromide, silver chlorobromide or emulsion which contain a smal amount of, for example, up to 10 mole percent of silver iodide.

Color photographic layers containing the azo dyes of the present invention can be applied onto any support such as paper, baryta-coated paper, polyethylene coated paper or paper which has in some other way been rendered hydrophobic, glass, metallized foils of all types, cellulose actates, in particular cellulose triacetate, in transparent or white pigmented form. They can also be cast on backed, transparent or pigmented foils of polyesters, especially polyethylene terephthalate, polycarbonates and other polyesters.

Apart from being used as image dyes for the silver dye bleaching process, the dyes according to the invention are also eminently suitable for the production of filter layers for photographic purposes because of their considerable fasteness to light and their spectral properties.

EXAMPLE 1

4 g. of the dye of Formula 1 is dissolved in 400 ml. of a 4% gelatin solution with the use of 0.7 g. of saponine and mixed with 800 ml. of a molten silver bromide emulsion containing 25 g. of silver bromide per liter. The emulsion is stabilized by addition of 10 ml. of a 0.1% methanolic solution of N-phenylmercaptotetrazole and hardened by addition of 3 ml. of a 30% aqueous solution of formaldehyde. One sample of the mixture is applied onto a support of baryta-coated paper and another sample onto a cellluose triacetate carrier. The layers have a thickness corresponding to a silver coating of 0.6 to 0.9 g. of silver per m.$^2$, and the layers are then dried.

A sample strip from each of the materials produced as described above is exposed behind a grey step wedge with white light and processed as follows:

(1) Developing for 5 minutes in the following developer: p-methylaminophenol 1 g., hydroquinone 3 g., sodium sulfite sicc. 13 g., sodium bromide 1 g., soda sicc. 26 g. water up to 1000 ml.

(2) Rinsing in water for 5 minutes.

(3) Fixing for 5 minutes in a bath of sodium thiosulfate cryst. 200 g. potassium metabisulfite 20 g., water up to 1000 ml.

(4) Rising in water for 5 minutes.

(5) Hardening for 5 minutes in a bath containing a 30% aqueous solution of formaldehyde 100 ml., sodium bicarbonate 2 g., water up to 1000 ml.

(6) Rinsing in water for 5 minutes.

(7) Dye-bleaching for 15 minutes in a solution of potassium iodide 10 g., sodium hypophosphite 10 g., sulfuric acid conc. 75 ml. quinoline 50 ml., water up to 1000 ml.

(8) Washing to 5 minutes.

(9) Bleach-fixing for 10 minutes in bath of tetrasodium ethylene diamine tetracetate 26 g., ferric chloride 15 g., soda sicc. 24 g., sodium sulfite sicc. 13 g., sodium thiosulfate 200 g., water up to 800 ml.

(10) Final rinsing in water for 20 minutes.

After drying, two pure yellow dye wedges are obtained, showing high brilliance with clear whites, no dye diffusion and excellent fastness to light. The layers are very suitable as part of a photographic multicolor material.

EXAMPLE 2

The procedure indicated in Example 1 is employed except that the dye-containing emulsion is applied onto a white pigmented cellulose triacetate support. After exposure and processing in baths 1 to 6 described in Example 1, the procedure is as follows:

(7) Dye-bleaching for 5 minutes in a bath of thiourea 28 g., potassium bromide 18 g., 2-amino-3-hydroxyphenazine 3 mg., conc. hydrochloric acid 400 ml., water up to 1000 ml.

(8) Rinsing in water for 5 minutes.

(9) Bleaching for 5 minutes in a bath of copper chloride 25 g., conc. hydrochloric acid 10 ml., water up to 1000 ml.

(10) Fixing for 5 minutes in the bath of step (3) in Example 1.

(11) Final rising in water for 20 minutes.

After drying, a result quite similar to that of Example 1 is obtained.

EXAMPLE 3

The procedure is the same as that described for Example 1 or 2 but another of the dyes 2 to 80 of the table is used.

After exposure and processing, the results obtained are very similar to those mentioned in Example 1 or 2. The dye wedges are characterized by high brilliance. The color is yellow slightly tinged with green to red.

In the case of dyes containing two or fewer than two sulfonic acid groups per naphthalene radical, it is frequently advisable to carry out the solution in the presence of wetting agents or polar solvents. In some cases it is also advantageous to distribute the dyes finely in the gelatin solution with a high speed mixer.

EXAMPLE 4

The procedure is the same as that described in Example 1 but instead of the dye of Formula 1, the dye of Formula 21 is used. The preparation of the dye-containing emulsion is applied onto a baryta-coated paper which has been coated with polyethylene on both sides by extrusion and rendered hydrophilic by corona discharge as described, e.g., in French Pat. No. 1,353,771.

After drying, the above photographic element is exposed and processed as follows:

(1) Developing for 5 minutes in a bath as indicated in Example 1.

(2) Rinsing in water for 5 minutes.

(3) Bleaching for one minute in a solution of potassium bichromate 10 g., conc. sulfuric acid 5 g., water up to 800 ml.

(4) Rinsing in water for one minute.

(5) Treatment for one minute in a bath of anhydrous sodium sulfite 5 g., water up to 1000 ml.

(6) Rinsing in water for one minute.

(7) Uniform exposure for 2.5 minutes with a 40 watt incandescent lamp at a distance of 20 cm.

(8) Second development as under (1).

(9) Hardening and further processing by steps (5) to (11) as described in Example 1.

After drying, a yellow dye wedge with a slight red tinge and excellent brilliance and having a characteristic curve opposite to that of the original is obtained. Similar resulte are obtained with other dyes according to the invention.

EXAMPLE 5

A color photographic multilayer material for the silver dye bleach process is prepared as follows:

The following layers are applied in succession onto a support of baryta-coated paper:

(1) A red-sensitized layer containing 12 mg. of a sensitizer described in German Pat. No. 1,177,481, Example 11, for every 500 g. of a silver bromide emulsion containing 5 mole percent of silver iodide, as well as 2.7 g. of the dye of the following formula:

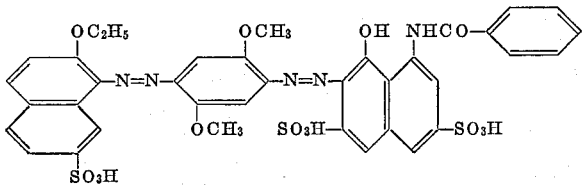

dissolved in 250 ml. of a 2% gelatin solution which at the same time contains the usual quantities of hardening agents as well as 0.5 g. of saponine, this layer being cast to a thickness which gives a silver content of 0.8 g. per m.$^2$.

(2) An intermediate layer of a 2% gelatin solution.

(3) A green-sensitive layer which contains 15 mg. of a sensitizer as described in German Pat. No. 1,177,481, Examples 2 to 10 for every 500 ml. of a silver bromide emulsion containing 5 mole percent of silver iodide and 2.5 g. of the dye of the following formula:

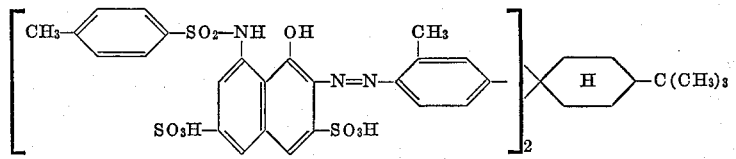

which is prepared according to German Pat. No. 1,039,840, dissolved in 200 ml. of a 2% gelatin solution which at the same time contains the usual quantities of hardening agents and 0.4 g. of saponine, the silver applied to give a coating of 0.75 g. per cm.$^2$.

(4) An intermediate layer of a 4% gelatin solution to which 8 g. of tartrazine are added per liter.

(5) A non-sensitized emulsion layer containing silver bromide as used in Example 1.

(6) A protective layer of 2% gelatin solution.

After drying, the film is exposed behind a multi-color transparency and processed as described in Example 1, except that the time of treatment in the dye bleaching bath is increased to 25 minutes. If the sensitivities of the individual layers are correctly adjusted, a copy with true color reproduction of the original is obtained.

EXAMPLE 6

The procedure is the same as that described in Example 5 except that the layer of gelatin with tartrazine interposed between the green-sensitized layer and the non-sensitized emulsion layer is replaced by an arrangement of layers as follows:

(1) An intermediate layer produced from a 2% gelatin solution;
(2) A gelatin filter layer containing a colloidal distribution of yellow silver (optical density 0.3 for a layer thickness of 1 mm.) as well as 0.3 g. of dye No. 13;
(3) An intermediate layer produced from a 2% gelatin solution.

After drying, exposure and processing as described in Example 5, reproduction in tone colors in outstanding brilliant tones is obtained.

EXAMPLE 7

An azo dye-containing emulsion is prepared as described in Example 1 with the exception that the dye of Formula 33 is applied instead of dye 1.

The resulting material is processed according to Example 1 where the dye-bleaching bath (7), however, additionally contains 50 mg. of 2,3-dimethylquinoxaline. An outstanding yellow dye image is obtained.

Similar results are obtained with other dyes according to the invention, for instance, dyes 33–75.

EXAMPLE 8

A color photographic multilayer material for the silver dye bleach process is produced as follows: The following layers are coated successively onto a support of baryta-coated paper:

(1) A panchromatically sensitized silver bromide gelatin emulsion layer (silver coating 0.6 g./m.²) which contains per kg. of emulsion 4 g. of the blue-green dye of the following formula:

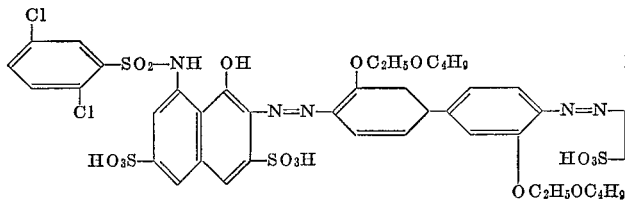

the preparation of the dye is described in German Auslegeschrift 1,041,355.

(2) An orthochromatically sensitized silver bromide gelatin emulsion layer (silver coating 0.7 g. silver per m.²) which contains, per kg. 4 g. of the dye of the following formula:

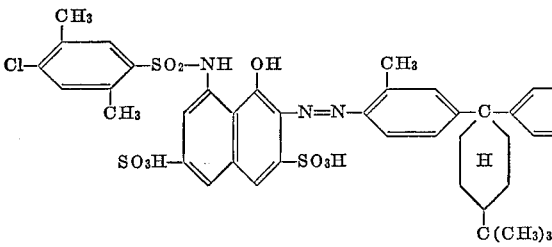

The preparation of the dye is described in German Pat. No. 1,039,840.

(3) A non-sensitized silver bromide gelatin emulsion layer (silver coating 0.7 g. silver per m.²) which contains per kg. of emulsion, 4.5 of dye 33 of the present invention.

After drying, the photographic element thus produced is exposed behind a multicolored transparency and processed as described in Example 7 but the time of treatment in the dye bleaching bath is increased to 25 minutes. If the sensitivities of the individual layers are correctly adjusted, a true colored reproduction of the original is obtained.

What is claimed is:
1. A light sensitive photographic silver halide material for the silver dye bleach process containing a bleachable azo dye of the formula

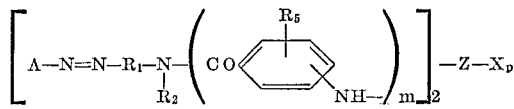

wherein
A is

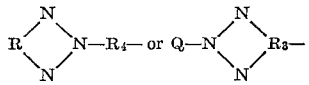

R being a ring of the benzene or naphthalene series, fused to the triazole ring at ortho locations;
Q being a ring of the benzene or naphthalene series;
$R_3$ being a ring of the benzene or naphthalene series, fused to the triazole ring at ortho locations; and
$R_4$ being a bivalent radical of the phenylene or naphthylene series;
and
$R_1$ is a bivalent radical of the p-phenylene or 1,4-naphthylene series;
$R_2$ is hydrogen or alkyl;
$R_5$ is hydrogen, alkyl, alkoxy, or sulfo;
Z is acyl, alkyl or aryl substituted carbamyl, or a bivalent acyl radical, obtained from a bivalent carboxylic acid selected of the group consisting of carbonic acid, fumaric acid, benzene dicarboxylic acid, carboxy cinnamic acid stilbene dicarboxylic acid, phenylenediamine-N,N'-dicarboxylic acid, thiophenedicarboxylic acid, furane dicarboxylic acid and pyridine dicarboxylic acid;
X is aniline or hydroxyl radical;
$m$ is zero, 1 or 2;
$n$ is an integer from 1 to 2;
$p$ is 1 when $n$ is 1, and is 0 when $n$ is 2;
and at least one ring in the dye is sulfo-substituted.

2. The combination of claim 1, wherein $R_3$ and $R_4$ are napthyl groupings substituted with at least one sulfo group.

3. The combination of claim 1 in which the dye has at least two sulfo groups in the molecule.

4. The combination of claim 1 in which A is

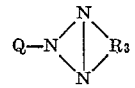

and $R_3$ is a 4,8-disulfo naphthyl group having N=N in 2-position and the triazloe ring fused in 5,6-position.

5. A light sensitive photographic material as defined in claim 1 wherein $m$ is 0 or 1.

6. A light sensitive photographic material as defined in claim 2, wherein $m$ is 0 or 1.

7. A light sensitive photographic material as defined in claim 4, wherein $m$ is 0 or 1.

References Cited

UNITED STATES PATENTS 3,318,700  5/1967  Anderau _____ 96—53

FOREIGN PATENTS 524,566  8/1940  Great Britain.

J. TRAVIS BROWN, Primary Examiner

U.S. Cl. X.R.

96—20, 53, 84